(12) United States Patent
McCann

(10) Patent No.: US 6,990,347 B2
(45) Date of Patent: Jan. 24, 2006

(54) METHODS AND SYSTEMS FOR MOBILE APPLICATION PART (MAP) SCREENING

(75) Inventor: Thomas Matthew McCann, Morrisville, NC (US)

(73) Assignee: Tekelec, Calabasas, CA (US)

( * ) Notice: Subject to any disclaimer, the term of this patent is extended or adjusted under 35 U.S.C. 154(b) by 987 days.

(21) Appl. No.: 09/802,527

(22) Filed: Mar. 7, 2001

(65) Prior Publication Data

US 2001/0046856 A1  Nov. 29, 2001

Related U.S. Application Data

(60) Provisional application No. 60/187,443, filed on Mar. 7, 2000.

(51) Int. Cl.
*H04Q 7/22* (2006.01)

(52) U.S. Cl. .................. 455/445; 455/560; 370/467; 370/469

(58) Field of Classification Search ........... 455/424, 455/426.1, 434, 445, 423, 407, 560, 406; 370/230, 401, 402, 463, 465–467, 469; 379/229
See application file for complete search history.

(56) References Cited

U.S. PATENT DOCUMENTS

| | | | |
|---|---|---|---|
| 5,579,371 A | | 11/1996 | Aridas et al. |
| 6,006,098 A | | 12/1999 | Rathnasabapathy et al. |
| 6,091,958 A | | 7/2000 | Bergkvist et al. |
| 6,091,959 A | | 7/2000 | Souissi et al. |
| 6,097,948 A | * | 8/2000 | Sjodin .................. 455/426.1 |
| 6,097,960 A | | 8/2000 | Rathnasabapathy et al. |
| 6,119,014 A | | 9/2000 | Alperovich et al. |
| 6,122,510 A | | 9/2000 | Granberg |
| H1895 H | | 10/2000 | Hoffpauir et al. |
| 6,134,438 A | | 10/2000 | Sawyer |
| 6,144,663 A | | 11/2000 | Hallenstal |
| 6,175,743 B1 | | 1/2001 | Alperovich et al. |
| 6,233,234 B1 | * | 5/2001 | Curry et al. ............... 370/356 |
| 6,311,055 B1 | * | 10/2001 | Boltz ..................... 455/414.1 |
| 6,381,465 B1 | | 4/2002 | Chern et al. |
| 6,505,046 B1 | | 1/2003 | Baker |
| 6,757,745 B1 | * | 6/2004 | Hamann et al. ............ 709/250 |
| 6,775,267 B1 | * | 8/2004 | Kung et al. ............... 370/352 |
| 2002/0015403 A1 | * | 2/2002 | McConnell et al. ........ 370/352 |
| 2002/0029189 A1 | * | 3/2002 | Titus et al. ................ 705/39 |
| 2002/0050927 A1 | | 5/2002 | De Moerloose et al. |
| 2003/0083078 A1 | * | 5/2003 | Allison et al. ............. 455/466 |

FOREIGN PATENT DOCUMENTS

DE  198 05 261 A1  8/1999

(Continued)

OTHER PUBLICATIONS

Commonly-assigned, co-pending U.S. Appl. No. 10/824,318 for "Methods and Systems for Mobile Application Part (MAP) Screening in Transit Networks," (Unpublished, filed Apr. 14, 2004).

(Continued)

*Primary Examiner*—Nguyen T. Vo
*Assistant Examiner*—Blane J. Jackson
(74) *Attorney, Agent, or Firm*—Jenkins, Wilson & Taylor, P.A.

(57) ABSTRACT

Methods and systems for mobile application part (MAP) screening include a signaling gateway having a MAP screening module. The MAP screening module includes a MAP screening process and a signalling connection control part (SCCP) screening process. The SCCP screening process determines whether the message is a candidate for MAP screening. The MAP screening process determines whether the message is a candidate for SCCP authorization.

53 Claims, 6 Drawing Sheets

FOREIGN PATENT DOCUMENTS

| EP | 0 710 043 A1 | 5/1996 |
|---|---|---|
| WO | WO99/40748 | 8/1999 |

OTHER PUBLICATIONS

"Digital Cellular Telecommunications System (Phase 2+); Technical Realization of the Short Message Service (SMS); (GSM 03.40 version 7.4.0 Release 1998)," ETSI TS 100 901, ETSI, p. 1-121, (Dec. 1999).

"Digital Cellular Telecommunications System (Phase 2+); Location Registration Procedures (GSM 03.12 version 7.0.0 Release 1998)," ETSI TS 100 530, ETSI, p. 1-10, (Aug. 1999).

KAMALA URS, "Roaming Notification and Local Service Control Through Short Message Service," Motorola, p. 17-19, (Mar. 1998).

"Digital Celluluar Telecommunications System (Phase 2); Mobile Application Part (MAP) Specification (GSM 09.02 version 4.16.1)," ETS 300 599, ETSI, p. 1-786, (Aug. 1997).

"Eagle Feature Guide," P/N 910-1225-01, Revision A, Tekelec, p. 1-144, (Mar. 1996).

Chatras et al., "Mobile Application Part Design Principles," International Switching Symposium, vol. 1, p. 35-42, (May-Jun., 1990).

* cited by examiner

METHODS AND SYSTEMS FOR MOBILE APPLICATION PART (MAP) SCREENING

RELATED APPLICATIONS

This application claims the benefit of U.S. Provisional Patent Application No. 60/187,443, filed Mar. 7, 2000, the disclosure of which is incorporated herein by reference in its entirety.

TECHNICAL FIELD

The present invention relates generally to methods and systems for screening signaling system 7 (SS7) messages. More particularly, the present invention relates to methods and systems for performing mobile application part (MAP) screening of SS7 messages.

BACKGROUND ART

In conventional SS7 networks, message screening can occur at signal transfer points (STPs) in order for the service provider that owns the STP and the associated network to control access to the network. For example, a service provider may desire to only pass SS7 signaling messages that are from another service provider with which the first service provider has an agreement. Another example in which screening may be desirable is when a service provider wishes to block certain types of traffic, such as SPAM SMS (Short Message Service) messages, from entering the network. Yet another example in which it may be desirable to screen incoming SS7 messages is when the messages request information regarding the service provider's subscribers. In this example, it may be desirable to block such queries, charge a fee for the queries, or only allow queries of a certain type or from an authorized destination.

Screening of incoming SS7 messages at an STP has traditionally been performed at the message transfer part (MTP) or the signaling connection control part (SCCP) level. While screening at the MTP or SCCP levels may be effective for controlling traffic to or from a particular node, such screening does not effectively allow screening based on upper layer protocols in messages, such as MAP protocols.

MAP messages are SS7 messages that reside on top of the transaction capabilities application part (TCAP) and SCCP protocol layers. MAP messages carry services used by mobile telephone subscribers, such as anytime interrogation (ATI) service and short message service (SMS). Anytime interrogation service is a service in which queries can be sent from SS7 service control points (SCPs) to home location registers (HLRs) to determine information regarding mobile subscribers. It may be desirable for the owner of the HLR to identify ATI messages and determine whether the requester should be given access to the information. Similarly, it may be desirable to identify and police SMS messages so that subscribers and/or service providers can be charged for SMS message delivery.

Identifying and policing higher level protocol messages, such as MAP messages, is difficult, if not impossible using conventional gateway and SCCP screening alone because these functions work only on lower layer information. Accordingly, there exists a long-felt need for novel methods and systems for mobile application part (MAP) message screening.

SUMMARY OF THE INVENTION

Methods and systems for mobile application part message screening include a switching node having a mobile application part screening module. The mobile application part screening module includes a mobile application part screening process for receiving an incoming SS7 message including mobile application part layer information. The mobile application part screening module reads at least some of the mobile application part layer information and determines whether to route the message based on the mobile application part information.

The methods and systems for performing mobile application part screening are described herein as processes, functions, and modules. It is understood that these processes, functions, and modules may be implemented in hardware, software, or a combination of hardware and software. For example, the mobile application part screening module may include a printed circuit board, a microprocessor, and memory for storing programs for performing MAP and SCCP screening.

Accordingly, it is an object of the present invention to provide novel methods and systems for performing mobile application part message screening.

DETAILED DESCRIPTION OF THE INVENTION

Figure 1:
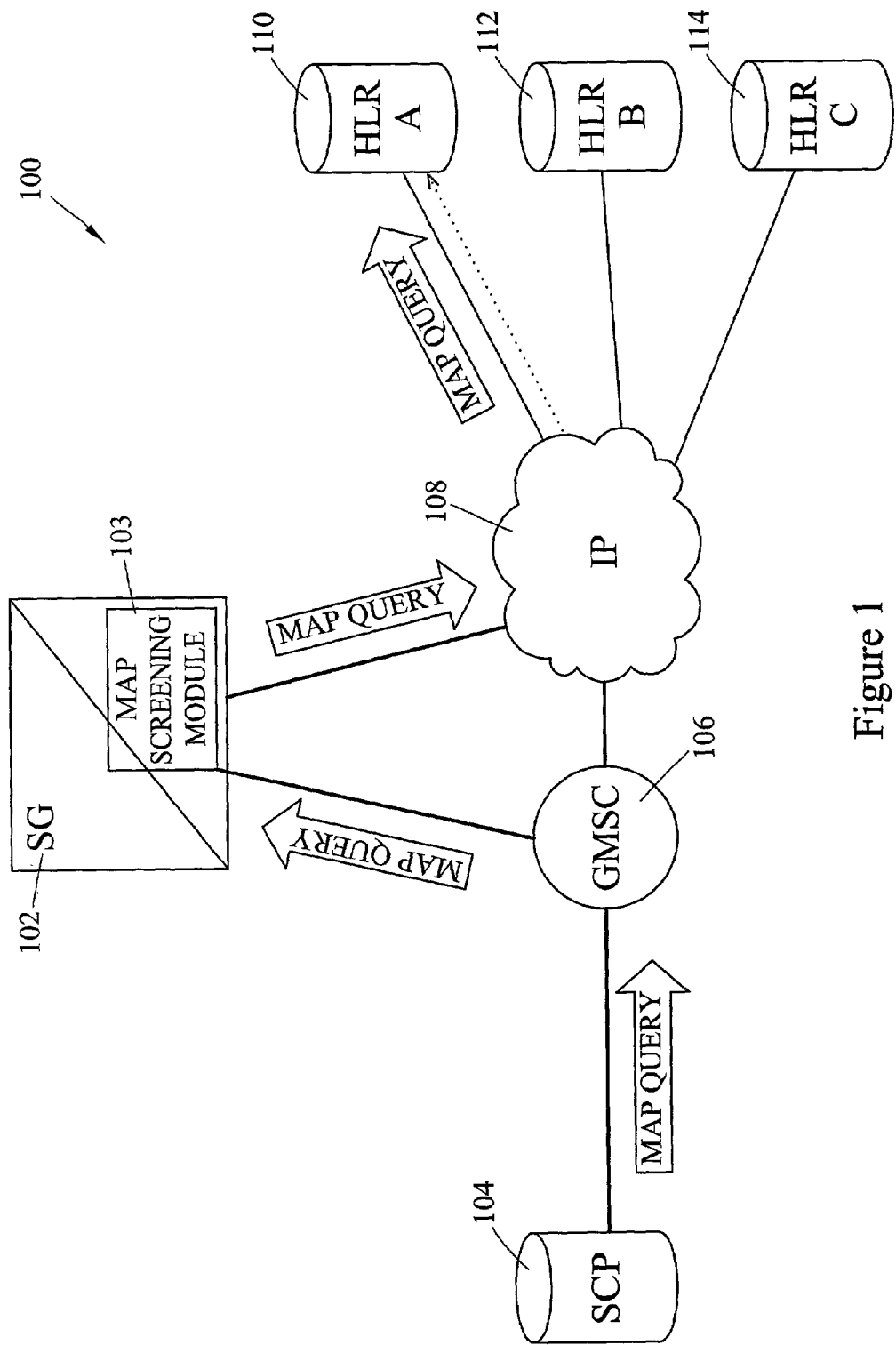
FIG. 1 is a block diagram of a telecommunications network in which a signaling gateway having a mobile application part screening module passes a mobile application part query according to an embodiment of the present invention.

FIG. 1 is a block diagram of a telecommunications network including a signaling gateway having a mobile application part screening module according to an embodiment of the present invention. In FIG. 1, telecommunications network 100 includes signaling gateway 102 having a mobile application part screening module 103. Signaling gateway 102 may include SS7 signal transfer point functionality for processing SS7 messages and internet protocol (IP) functionality for processing internet protocol messages. In a preferred embodiment, signaling gateway 102 comprises an Eagle® SS7/IP gateway available from Tekelec, Inc., of Calabasas, Calif. Details of the operation of signaling gateway 102 will be discussed below.

In the illustrated embodiment, SS7/IP gateway 102 includes MAP screening module 103 for screening mobile application part messages. MAP screening module 103 includes hardware and software for identifying mobile application part messages and screening the messages based on one or more mobile application part parameters. Example screening functions performed by MAP screening module 102 will also be discussed in more detail below.

Telecommunications network 100 also includes service control point (SCP) 104, gateway mobile switching center (GMSC) 106, and home location registers (HLRs) 110, 112, and 114. Service control point 104 is an SS7 database node that in conventional SS7 networks provided information in response to queries from other nodes. In the illustrated embodiment, SCP 104 also includes the capability for formulating MAP queries, such as anytime interrogation queries, to obtain information from other nodes. GMSC 106 is a switching node that resides at the edge of a mobile network to send messages to and receive messages from other networks.

HLRs 110, 112, and 114 are databases used to store subscriber information within the home service area of a GSM provider. Functionally, HLRs 110, 112, and 114 are linked to other service areas such that subscriber information is efficiently shared between geographically diverse networks, a characteristic that facilitates seamless internetwork roaming of mobile subscribers. However, because HLRs 110, 112, and 114 contain information regarding mobile subscribers, it may be desirable for the owner of the subscriber information to regulate access to the subscriber information. It is this regulation that is enabled by the mobile application part screening according to embodiments of the present invention.

One example in which it may be desirable to perform mobile application part screening to control access to subscriber information stored in HLRs 110, 112, and 114 is when a MAP query, such as an ATI query, is received from an SCP owned by another service provider. In the illustrated embodiment, SCP 104 formulates a MAP query and sends the MAP query to signaling gateway 102 through GMSC 106. Since it is not desirable to perform MAP screening on every message that arrives at signaling gateway 102, signaling gateway 102 uses SCCP layer screening to filter messages for which it is not desirable to perform MAP screening. For example, if it is desirable to screen anytime interrogation messages that originate from SCPs, SCCP layer screening may be performed to eliminate from consideration mobile application part screening messages that are not from SCPs. SCCP layer screening may also be used to eliminate from consideration MAP screening messages that are not directed to protected information. If none of the SCCP layer screening eliminates the message from consideration for MAP screening, then MAP screening is performed on the message. MAP screening may include reading one or more MAP parameters in the message to determine whether the message is of a type for which screening is desired. For example, if the message is an anytime interrogation message, it may be desirable to screen the message. Finally, SCCP layer screening may be used to screen MAP messages that are from unauthorized nodes, i.e., nodes that are not permitted to access the desired resource. Thus, by using SCCP layer screening in combination with MAP screening, regulation of access to protected network information, such as mobile subscriber information, may be efficiently performed.

In FIG. 1, the MAP query is assumed to have passed all SCCP and MAP screening processes. Accordingly, the query is passed to HLR 110. HLR 110 responds with the requested subscriber information, and the response to the query follows the same path as the query. For an anytime interrogation query, the response may contain the location and/or status of a mobile subscriber. Thus, the result of MAP and SCCP screening in FIG. 1 is the passing of a query to its intended destination.

Figure 2:
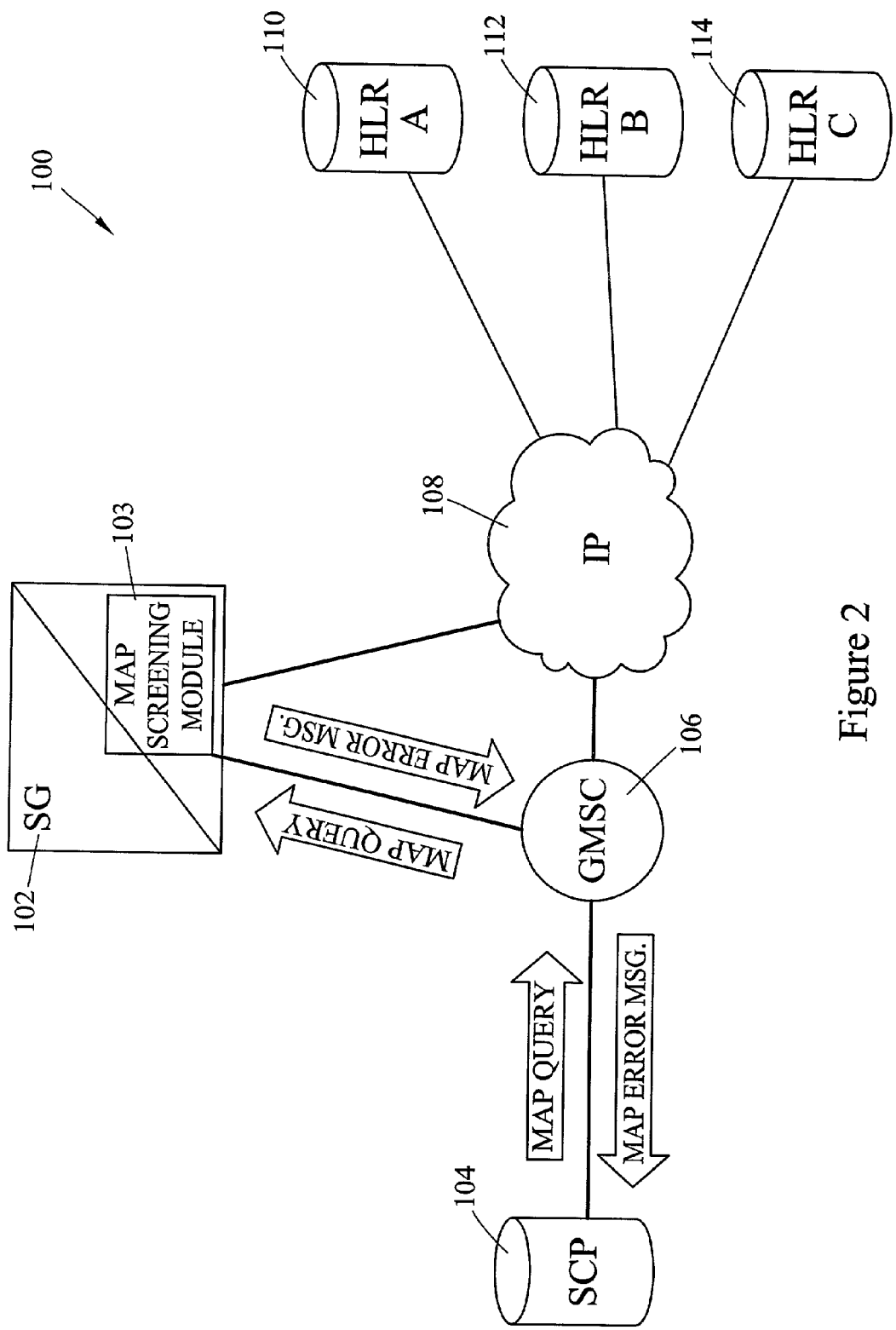
FIG. 2 is a block diagram of a telecommunications network in which a signaling gateway having a mobile application part screening module does not pass a mobile application part query according to an embodiment of the present invention.

The telecommunications network illustrated in FIG. 2 is the same network illustrated in FIG. 1. However, in FIG. 2, the MAP query is assumed not to pass one of the screening processes. For example, the MAP query from SCP 104 may be an ATI query requesting mobile subscriber information from HLR A 110. When SG 102 receives the query, SG 102 may analyze SCCP information in the query to determine that the query is from an SCP and that the query is addressed to HLR A 110, which contains limited access subscriber information. Since the SCCP information indicates that further inquiry is required, MAP screening module 103 may then read the MAP level information to determine if the message is of a type for which authorization is required. In this example, it is assumed that the query is an ATI query and that authorization is required. Accordingly, after identifying the message as an ATI query, MAP screening module determines whether the message is from an authorized user based on SCCP information in the message. In FIG. 2, it is assumed that the user is not an authorized user. As a result, MAP screening module formulates a MAP error message and sends the MAP error message to SCP 104 through GMSC 106. In an alternative example, MAP screening module 103 may permit access to only some of the requested information in HLR 110.

Figure 3:
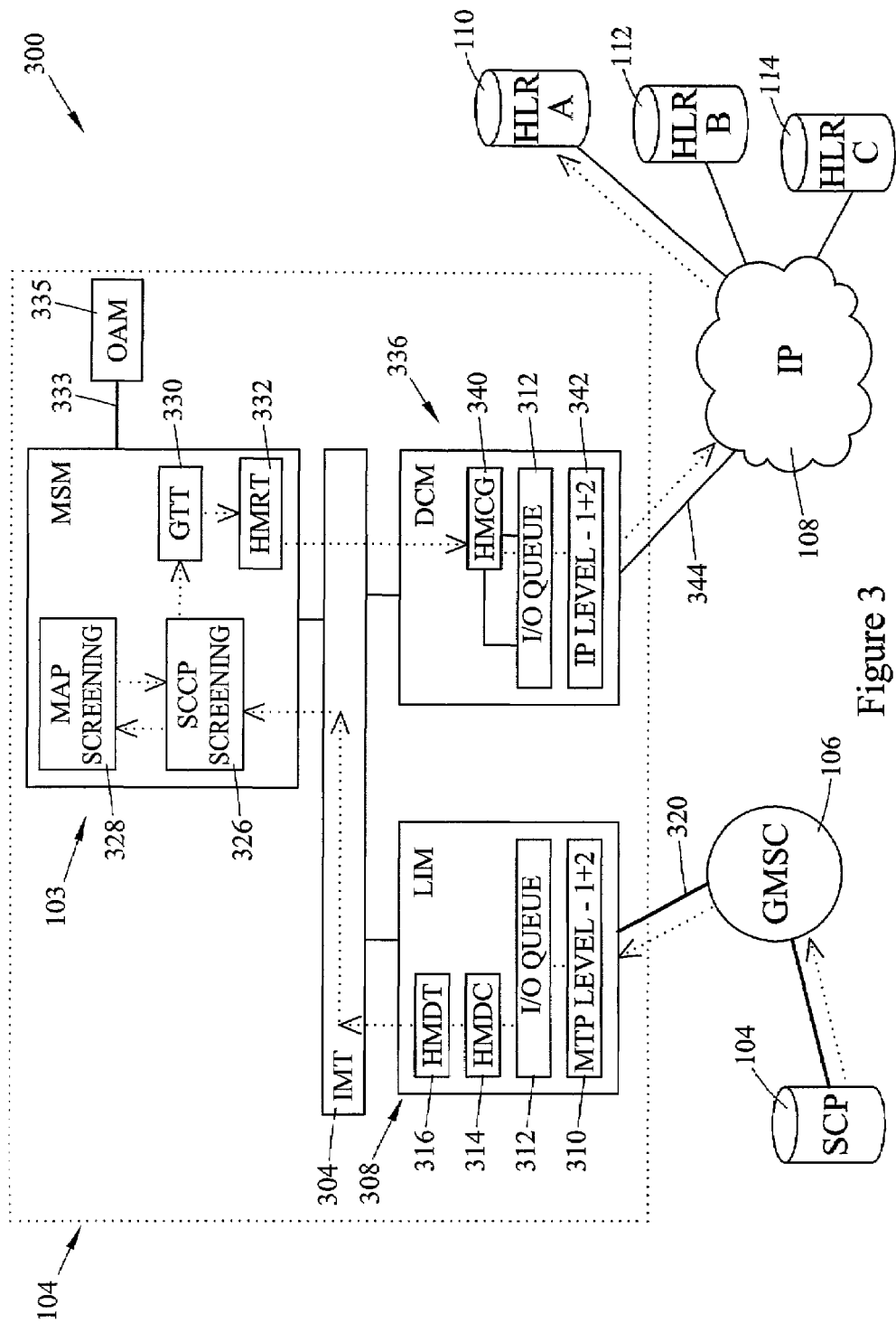
FIG. 3 is a block diagram illustrating a signaling gateway having a mobile application part screening module according to an embodiment of the present invention.

FIG. 3 illustrates the internal subsystems of signaling gateway 102, including MAP screening module 103, in more detail. In the illustrated embodiment, signaling gateway 102 includes link interface module 308 for sending and receiving SS7 messages over SS7 links. LIM 308 includes of a number of sub-components including, but not limited to: an SS7 MTP level 1 and 2 process 310, an I/O buffer or queue 312, HMDC process 314, and HMDT process 316. MTP level 1 and 2 process 310 provides the facilities necessary to send and receive digital data over a particular physical media/physical interface, as well as to provide error detection/correction and sequenced delivery of all SS7 message packets. I/O queue 312 temporarily buffers incoming and outgoing SS7 messages. HMDC process 314 performs a discrimination function for determining whether an incoming SS7 message packet requires internal processing or is simply to be through switched, i.e., routed to another node. HMDT process 316 handles internal routing of SS7 message packets that require additional processing prior to final routing.

Interprocessor message transport (IMT) bus 304 provides a reliable transport mechanism for transporting messages between modules in signaling gateway 102. In a preferred embodiment, IMT bus 304 comprises a dual counter-rotating bus so that traffic can be re-routed in response to a module failure.

MSM module 103 performs SCCP and MAP screening functions on messages received from LIM 308 and DCM 336. In the illustrated embodiment, MSM module 103 includes SCCP screening process 326 for performing SCCP screening functions on incoming messages, MAP screening process 328 for performing MAP screening of incoming messages, global title translation process 330 for performing global title translation of incoming messages, and HMRT function 332 for routing messages after screening and/or global title translation has been performed.

Although not illustrated in FIG. 3, it is understood that SCCP screening process 326 may access one or more internal or external SCCP screening databases, MAP screening process 328 may access one or more internal or external MAP screening databases, and GTT process 330 may access one or more internal or external GTT databases. In order to maintain the databases, MSM 103 is coupled to and serviced by an OAM subsystem 335 via an Ethernet connection 333. OAM subsystem 335 is responsible for administration and maintenance of the databases.

Data communication module (DCM) 336 is adapted to convert incoming IP-encapsulated SS7 messages into SS7 format and encapsulate outgoing SS7 messages in IP packets. In the illustrated embodiment, DCM 336 includes an HMCG process 340 that is responsible for monitoring congestion on the associated DCM linksets, and internally communicating this link congestion information to peer processes on other modules via IMT bus 304. The link congestion information is used by the HMRT function 332 during outbound link selection operations. It should be appreciated that outgoing SS7 message packets routed through the DCM 336 will be transmitted out of the signaling gateway 102 and into an Internet Protocol (IP) network 108.

As the SS7 communication protocol and the IP communication protocol are not inherently compatible, all SS7 message packets that are to be sent into the IP network 108 are first encapsulated within an IP routing envelope prior to transmission over the IP network and decapsulated before being transmitted over the SS7 network. This IP encapsulation and decapsulation is performed by an IP encapsulation/decapsulation process 342. IP encapsulation/decapsulation process 342 is the IP protocol equivalent of the SS7 MTP level 1–2 layer process 310 of the LIM 308. Preferred packet formats for encapsulating and decapsulating various types of SS7 messages in IP packets is described in Internet Engineering Task Force (IETF) INTERNET DRAFT: Transport Adapter Layer Interface, <draft-benedyk-sigtran-tali-01.txt>, June 2000, the disclosure of which is incorporated herein by reference in its entirety. The TALI protocol is also described in commonly-assigned co-pending international patent publication no. WO/761434 A1, published Dec. 14, 2000, the disclosure of which is incorporated herein by reference in its entirety. In addition to or alternatively to the TALI protocol, IP encapsulation/decapsulation process 342 may implement one or more SS7 user adaptation layers, such as the SS7 SCCP user adaptation (SUA) layer or the SS7 MTP3 user adaptation (M3UA) layer, and the stream control transmission protocol (SCTP). The SUA protocol is described in IETF Internet Draft: SS7 SCCP-User Adaptation Layer (SUA), <draft-ietf-sigtran-sua-05.txt>, February 2001, the disclosure of which is incorporated herein by reference in its entirety. The M3UA protocol is described in IETF Internet Draft: SS7 MTP3-User Adaptation Layer (M3UA), <draft-ietf-sigtran-m3ua-06.txt>, February 2001, the disclosure of which is incorporated herein by reference in its entirety. The stream control transmission protocol is described in IETF RFC 2960: Stream Control Transmission Protocol, October, 2000, the disclosure of which is incorporated herein by reference in its entirety.

Map and SCCP Screening

Figure 4:
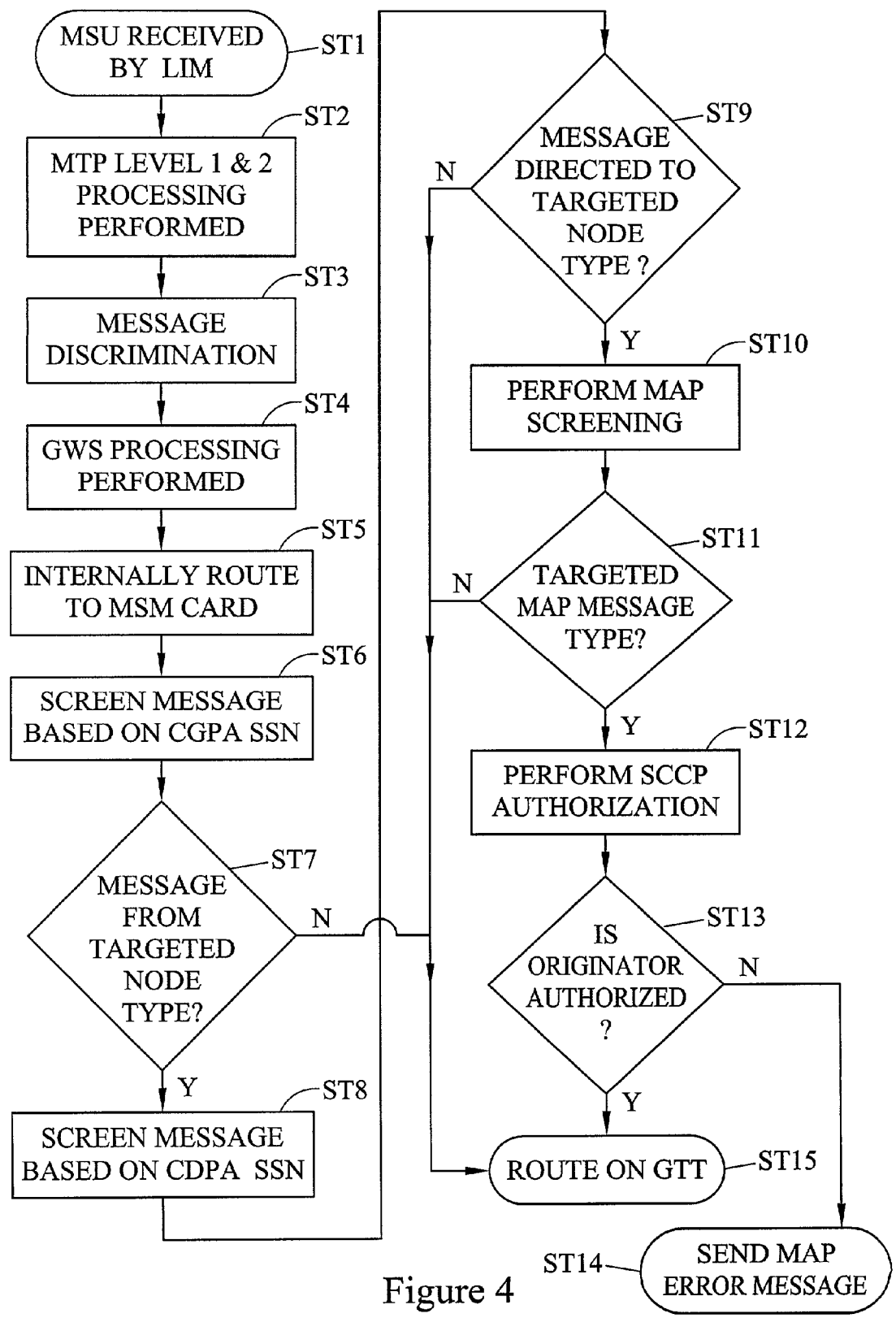
FIG. 4 is a flow chart illustrating mobile application part message screening performed by the signaling gateway illustrated in FIG. 3.

FIG. 4 is a flow chart illustrating exemplary steps that may be performed by the processes illustrated in FIG. 3 for performing MAP and SCCP screening functions. In step ST1, LIM 308 receives an SS7 message signal unit (MSU). In step ST2, MTP level 1 and 2 process 310 performs MTP level 1 and 2 processing on the incoming message. In step ST3, HMDC function 314 performs message discrimination, e.g., by examining the destination point code or other fields, in the message to determine whether the message is to be internally routed or through switched. In this example, it is assumed that the message is to be internally routed.

In step ST4, gateway screening is performed on the incoming message, for example, to determine whether the message is from an allowed OPC or has an allowed SIO value. In this example, it is assumed that the message passes the gateway screening process.

In step ST5, HMDT process 316 routes the message to the appropriate internal address for further processing. In this example, HMDT process 316 routes the message to MSM module 103 for further processing. Once MSM module 103 receives the message, in step ST6 SCCP screening process 326 screens the message based on the subsystem number (SSN) in the calling party address field of the message to determine whether the message is from a targeted node type. By "targeted node type" it is meant that the message is examined to determine whether the originating node is of a type for which it may be desirable to perform MAP screening. For example, it is known that anytime interrogation messages originate from SCPs. Accordingly, SCCP screening process 326 may be provisioned to determine that all queries received from SCPs are from targeted node types.

In step ST7, if SCCP screening process 326 determines that the message is from a targeted node type, in step ST8, SCCP screening process 326 examines the SSN value in the called party address field to determine whether the message is directed to a targeted node type. In this step, the destination node type is examined to determine whether it is of a type for which MAP screening may be desired. For example, it is known that anytime interrogation messages are directed to HLRs. In step ST9, if the SSN in the called party address field indicates that the message is directed to an HLR, the screening process continues.

In step ST10, MAP screening process 328 performs MAP screening on the message by examining the opcode field in the MAP portion of the message to determine the MAP message type and whether the message is of a type targeted for screening. Continuing with the present example, if the message is an anytime interrogation message, the message may be of a type targeted for screening. Accordingly, in step ST11, if it is determined that the MAP message type is of a type targeted for screening, in steps ST12 and ST13, SCCP authorization screening is performed on the message to determine whether the originator of the message is authorized to make the requested inquiry. The originator of the message may be identified by examining the SCCP calling party address field in the message. For example, one service provider may have an agreement with another service provider to allow the first service provider to make anytime interrogation queries to the second service provider's HLRs. If this is the case, the query may be allowed to pass. If not, in step ST14, an error message may be sent to the service provider from which the query originated.

In step ST15, if the originator is authorized to make the query, SCCP screening process 326 passes the query to GTT process 330 to undergo global title translation. After performing global title translation on the message, GTT process 330 passes the message to HMRT process 332, which routes the message to the appropriate outgoing address on LIM 308 or DCM 336. The result of failing one of the SCCP or MAP screening procedures in steps ST7, ST9, and ST11 is the same as passing all screening in step ST13, i.e., the message is routed to the intended destination because it is either not of a type for which authorization is required or it is of such a type and the user is authorized to make the query.

MAP-Based Billing System

Figure 5:
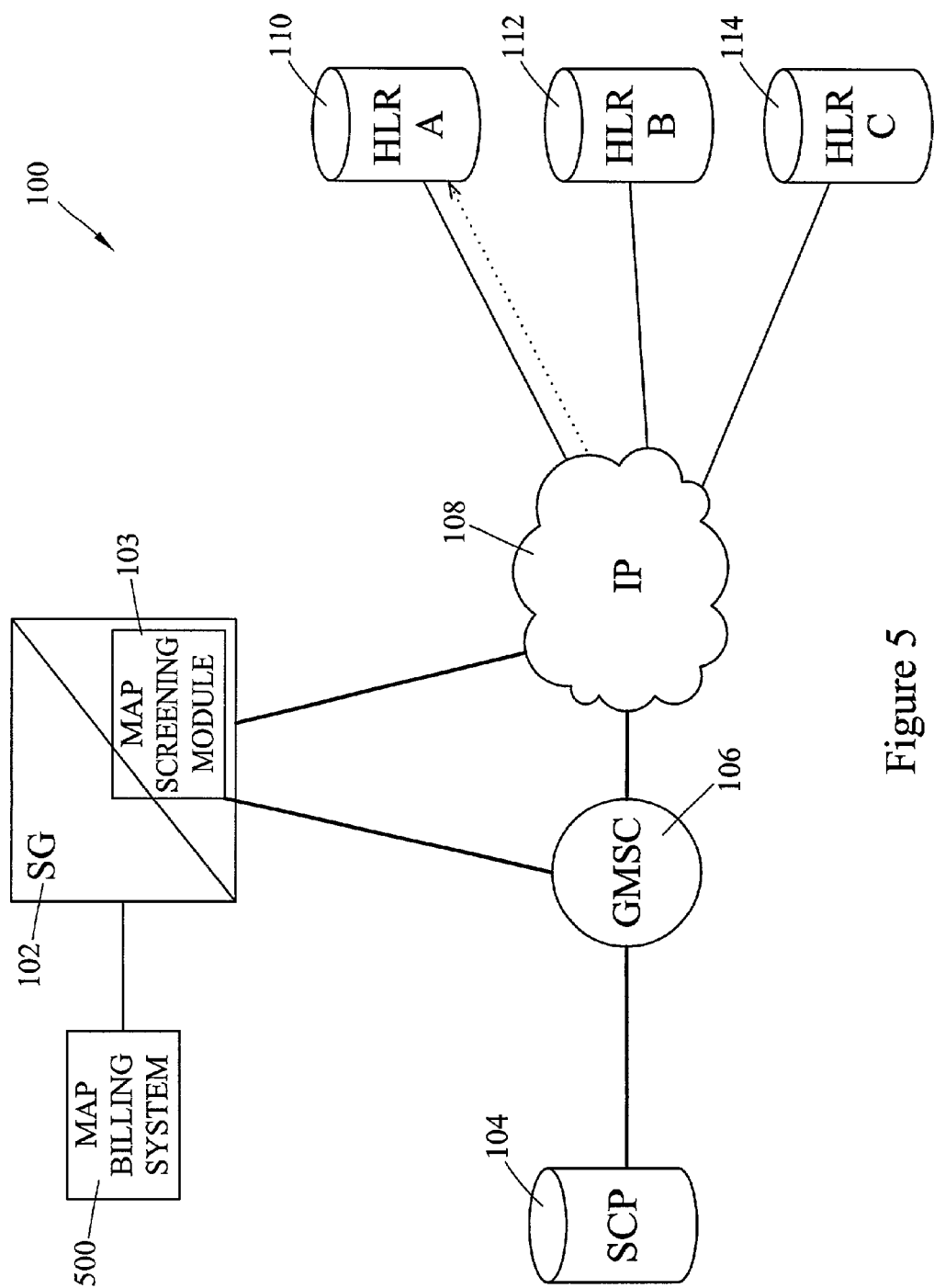
FIG. 5 is a block diagram of a telecommunications network including a billing system operatively associated with a signaling gateway having a mobile application part screening module according to an embodiment of the present invention.

FIG. 5 illustrates an alternative embodiment of the invention in which a MAP billing system 500 is operatively associated with signaling gateway 102. For example, MAP billing system 500 may comprise software residing on a computer located external to signaling gateway 500. Alternatively, MAP billing system 500 may comprise hardware, such as a card, and software located internal to signaling gateway 102 to perform MAP-based billing.

One example of MAP based billing according to the present embodiment is to bill service providers based on the number of MAP queries that pass the screening process. For example, if a service provider is authorized to make anytime interrogation queries to another service provider's HLRs, it may be desirable to bill the querying service provider based on the number of successful MAP queries to the HLR. When MAP screening module 103 allows a query to pass, MAP screening module 103 may send a copy of all or part of the parameters to MAP billing system 500. MAP billing system may create a MAP billing record for the message. An example of such a record is as follows:

| CgPA SSN | CdPA SSN | MAP Opcode | CgPA | Count | Interval |
|---|---|---|---|---|---|
| Value for SCP | Value for HLR | Value for ATI | Call Party Numbering Plan Address | Number of Queries | Time Interval |

In the example record, the CgPA and CdPA SSN fields store codes indicative of node types. The MAP opcode field stores the value for the MAP opcode of a successful message. CgPA field stores the numbering plan address of the originator. The count field stores the number of queries made with these field values. Finally, the interval field store the time interval for which the count applies. For example, the first time a given node makes a query to a given HLR, a record is created. The next time the same node makes a successful query to the same HLR, the count value in the previous field is updated. The record in the table shown above may be used to bill a calling party or a service provider based on the number of queries made that match the values in the table.

Figure 6:
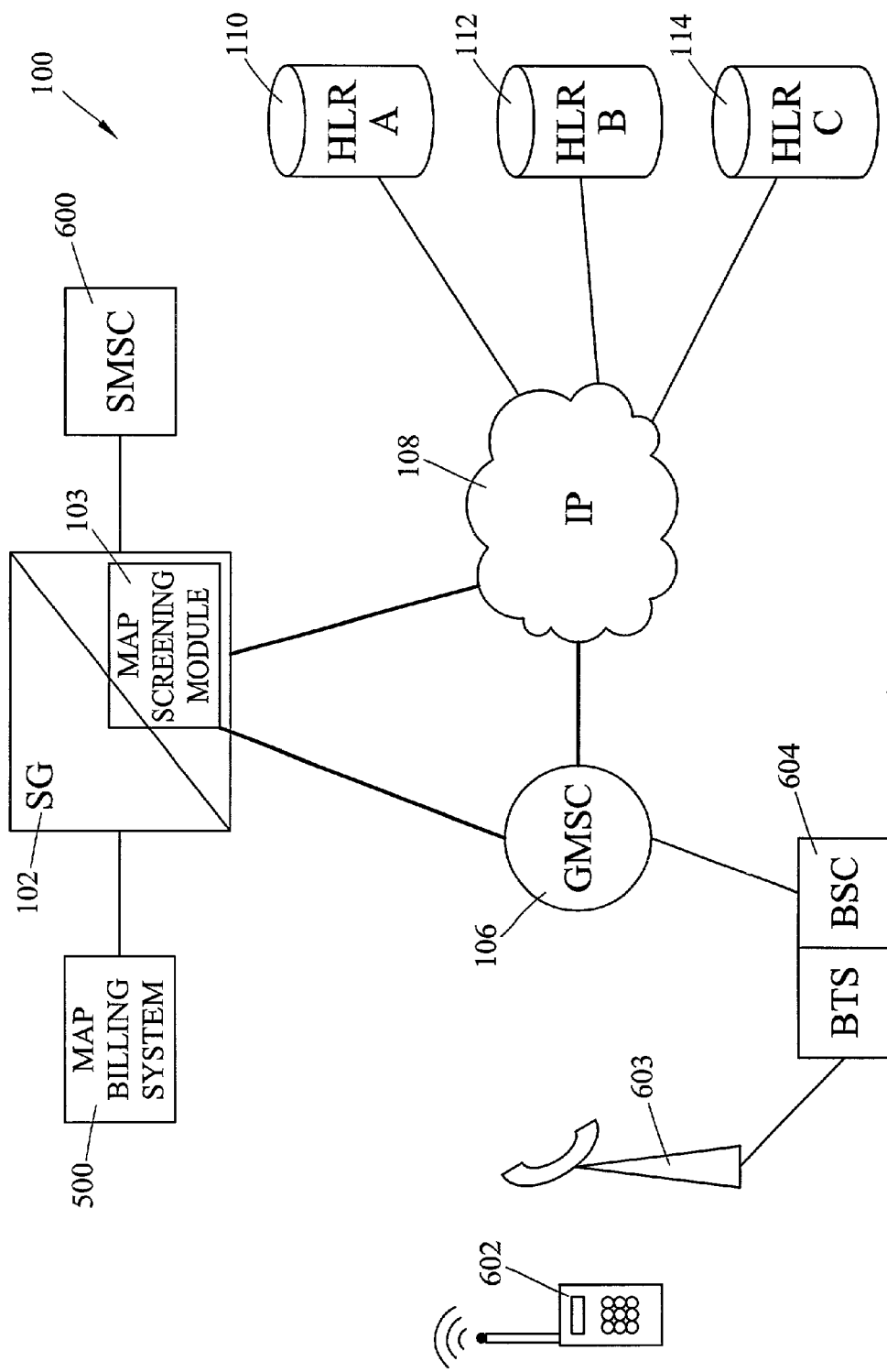
FIG. 6 is a block diagram of a telecommunications network including a short message service center and a billing system operatively associated with a signaling gateway having a mobile application part screening module according to an embodiment of the present invention.

FIG. 6 illustrates yet another alternative embodiment of the present message in which a MAP billing system 500 and a short message service center (SMSC) 600 are operatively associated with signaling gateway 102. In the network illustrated in FIG. 6, it may be desirable to charge other service providers for the use of SMSC 600 to forward short messages. For example, a mobile station, i.e., a handset, from another network may send a forward short message (FSM) message to SMSC 600. In the illustrated embodiment, handset 602 originates a short message. The short message is received by mobile receiving site 603. Base station controller/base transceiver station pair (BSCI BTS) 604 receives the short message and forwards the message to GMSC 103. GMSC 103 forward a FSM message to SG 102. MAP screening module 103 in signaling gateway 102 may perform MAP and SCCP screening functions, as described above. If the FSM message passes one or more SCCP and/or MAP based screening criteria, the message may be routed to SMSC 600. MAP billing system 500 may generate billing records based on the number of FSM messages that are routed to SMSC 600. Thus, the present embodiment provides a mechanism for billing based on mobile-originating SMS messages.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A network element for receiving a signaling message containing mobile application part (MAP) protocol information and screening the message based on the MAP protocol information, the network element comprising:

(a) a communication module capable of receiving from a communication network and transmitting to a communication network a signaling message including MAP information;

(b) a signaling connection control part (SCCP) screening process for receiving the signaling message from the communication module and determining whether or not the signaling message is a candidate for MAP screening based on at least one SCCP parameter in the signaling message, wherein the SCCP process is adapted to forward the signaling message for MAP screening in response to a determination that the signaling message is a candidate for MAP screening and wherein the SCCP screening process is adapted to forward the signaling message for outbound routing in a manner that bypasses MAP screening in response to a determination that signaling message is not a candidate for MAP screening; and (c) a MAP screening process for, in response to a determination that the signaling message is a candidate for MAP screening, receiving the message from the SCCP screening process, analyzing the MAP information to determine whether authorization is required for routing the signaling message to a destination node.

2. The network element of claim 1 wherein, in response to receiving notification from the MAP screening process that authorization is required for the signaling message, the SCCP screening process is adapted to perform authorization screening on the signaling message based on at least one SCCP parameter in the signaling message.

3. The network element of claim 1 wherein the SCCP screening process examines a subsystem number in a calling party address field in the signaling message to determine whether the node that originated the signaling message is of a type for which MAP screening may be required.

4. The network element of claim 1 wherein the SCCP screening process examines a subsystem number in a called party address field in the signaling message to determine whether the message is addressed to a destination node type for which MAP screening may be required.

5. The network element of claim 1 wherein the MAP screening process examines an op code field in the signaling message to determine whether signaling message is a MAP message type for which authorization may be required.

6. The network element of claim 5 wherein the MAP screening process is adapted to examine the op code field to determine whether the message is an anytime interrogation (ATI) message.

7. The network element of claim 5 wherein the MAP screening process is adapted to examine the op code field to determine whether the message is a short message service (SMS) message.

8. The network element of claim 2 wherein the SCCP screening process is adapted to perform authorization screening based on a calling party address value in the signaling message.

9. The network element of claim 8 wherein the SCCP screening process is adapted to route the message to the destination in response to determining that the signaling message passes the authorization screening.

10. The network element of claim 9 wherein the SCCP screening process is adapted to route the message to an Home Location Register (HLR) in response to determining that the signaling message passes the authorization screening.

11. The network element of claim 9 wherein the SCCP screening process is adapted to route the message to an visitor Location Register (VLR) in response to determining that the signaling message passes the authorization screening.

12. The network element of claim 9 wherein the SCCP screening process is adapted to route the message to an authentication center (AuC) in response to determining that the signaling message passes the authorization screening.

13. The network element of claim 9 wherein the SCCP screening process is adapted to route the message to a short message service center (SMSC) in response to determining that the signaling message passes the authorization screening.

14. The network element of claim 9 wherein the SCCP screening process is adapted to route the message to an equipment identity register (EIR) in response to determining that the signaling message passes the authorization screening.

15. The network element of claim 9 wherein the SCCP screening process is adapted to route the message to a database server in response to determining that the signaling message passes the authorization screening.

16. The network element of claim 1 wherein the signaling message contains a database query.

17. The network element of claim 1 wherein the signaling message is an SS7 message.

18. The network element of claim 1 wherein the signaling message is an Internet Protocol (IP) encapsulated SS7 message.

19. The network element of claim 18 wherein the SS7 message is IP encapsulated in a transport adapter layer interface packet.

20. The network element of claim 18 wherein the SS7 message is IP encapsulated in an IETF (Internet Engineering Task Force) adapter layer running over SCTP (Stream Control Transmission Protocol).

21. A method for determining whether a signaling message received by a network routing element should be discarded or routed to a destination node, the method comprising:

(a) at a first network element, receiving a signaling message containing mobile application part (MAP) and signaling connection control part (SCCP) information from a communication network;

(b) determining whether or not the received signaling message is a candidate for MAP screening by examining the SCCP information contained in the signaling message;

(c) in response to determining that the signaling message is not a candidate for MAP screening, bypassing MAP screening and routing the signaling message to a destination node; and (d) in response to determining that the signaling message is a candidate for MAP screening, screening the signaling message based on the MAP information contained within the signaling message.

22. The method of claim 21 wherein the signaling message is a Signaling System 7 (SS7) message.

23. The method of claim 21 wherein the communication network is a Global System for Mobile Communications (GSM) network.

24. The method of claim 21 wherein the communication network is an American National Standards Institute (ANSI)-41 based network.

25. The method of claim 21 wherein the destination node is a Home Location Register (HLR).

26. The method of claim 21 wherein the destination node is a Visitor Location Register (VLR).

27. The method of claim 21 wherein the destination node is a Authentication Center (AuC).

28. The method of claim 21 wherein the destination node is a Equipment Identification Register (EIR).

29. The method of claim 21 wherein the destination node is a database server.

30. The method of claim 21 wherein the destination node is a short message service center (SMSC).

31. The method of claim 21 wherein the signaling message contains a database query message.

32. The method of claim 21 wherein the SCCP information includes a Subsystem Number (SSN).

33. The method of claim 21 wherein the MAP information includes a MAP operation (op) code.

34. The method of claim 33 wherein the MAP information includes a subscriber location parameter that is associated with the op code.

35. The method of claim 33 wherein the MAP information includes a subscriber state parameter associated with the op code.

36. The method of claim 21 wherein the SCCP information includes an origination address.

37. The method of claim 36 wherein the origination address is an E.164 formatted number.

38. The method of claim 21 wherein the signaling message is an Internet Protocol (IP) encapsulated SS7 message.

39. The method of claim 38 wherein the SS7 message is IP encapsulated using a Transport Adapter Layer Interface (TALI) protocol.

40. The method of claim 38 wherein the SS7 message is IP encapsulated using an IETF adapter layer running over SCTP.

41. The method of claim 21 examining the SCCP information includes examining a MAP origination address.

42. The method of claim 21 wherein screening the signaling message based on MAP information includes screening the signaling message by comparing the MAP information to one or more MAP op codes.

43. The method of claim 21 wherein the screening the signaling message based on MAP information includes screening the signaling message by comparing the MAP information to one or more MAP parameters.

44. The method of claim 43 wherein the MAP parameters include a location value.

45. The method of claim 43 wherein the MAP parameters include a state value.

46. The method of claim 21 wherein screening the signaling message based on the MAP information includes discarding the signaling message in response to determining that the MAP information satisfies a predetermined condition.

47. The method of claim 21, wherein screening the signaling message based on the MAP information includes sending an error message to an originator of the signaling message in response to determining that the MAP information satisfies a predetermined condition.

48. A system for performing mobile application part (MAP) and signaling connection control part (SCCP) screening of signaling messages, the system comprising:

(a) a signaling gateway including SCCP and MAP screening modules for receiving signaling messages containing MAP and SCCP information, wherein the SCCP screening module is adapted to determine whether or not the signaling messages are candidates for MAP screening by examining the SCCP information in the signaling messages, and in response to determining that the signaling messages are candidates for MAP screening, the SCCP screening module is adapted to forward the signaling messages to the MAP screening module for MAP screening, and, in response to determining that the signaling messages are not candidates for MAP screening, for bypassing the MAP screening module and forwarding the signaling messages for outbound routing, and wherein the MAP screening module is adapted to screen signaling messages received from the SCCP screening module based on the MAP information and to forward signaling messages that meet predetermined MAP screening criteria to a destination node; and (b) a MAP billing system operatively associated with the signaling gateway for generating billing information based on the number of messages forwarded by the MAP screening module.

49. The system of claim 48 comprising a short message service center (SMSC) operatively associated with the signaling gateway for sending MAP short message service messages to the signaling gateway.

50. The system of claim 49 wherein the MAP screening module is adapted to perform MAP screening for the SMS forward short message (FSM) messages directed to a short message service center (SMSC) and the MAP billing system is adapted to generate billing records based on the number of FSM messages forwarded by the MAP module.

51. The system of claim 48 wherein the MAP screening module is adapted to perform MAP screening for anytime interrogation (ATI) queries and the MAP billing system is adapted to generate billing records based in the number of ATI queries forwarded by the MAP module.

52. The system of claim 51 wherein the billing system is adapted to generate billing records based on the number of subscriber location ATI queries forwarded by the MAP screening module.

53. The system of claim 51 wherein the billing system is adapted to generate billing records based on the number of subscriber state ATI queries forwarded by the MAP screening module.

* * * * *